US009499376B2

(12) United States Patent
Park

(10) Patent No.: US 9,499,376 B2
(45) Date of Patent: Nov. 22, 2016

(54) TURNAROUND MECHANISM FOR PASSENGER CONVEYORS

(71) Applicant: Otis Elevator Company, Farmington, CT (US)

(72) Inventor: Chan-Jong Park, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 14/434,643

(22) PCT Filed: Nov. 1, 2012

(86) PCT No.: PCT/US2012/063054
§ 371 (c)(1),
(2) Date: Apr. 9, 2015

(87) PCT Pub. No.: WO2014/070187
PCT Pub. Date: May 8, 2014

(65) Prior Publication Data

US 2015/0284217 A1 Oct. 8, 2015

(51) Int. Cl.

| | |
|---|---|
| ***B66B 23/14*** | (2006.01) |
| ***B66B 23/02*** | (2006.01) |
| ***B65G 17/18*** | (2006.01) |
| ***B66B 21/10*** | (2006.01) |

(52) U.S. Cl.
CPC ............. *B66B 23/147* (2013.01); *B66B 21/10* (2013.01)

(58) Field of Classification Search
CPC ........ B66B 23/14; B66B 23/02; B65G 17/18
USPC ........ 198/321, 322, 326, 327, 329, 330, 333
See application file for complete search history.

(56) References Cited

U.S. PATENT DOCUMENTS

| | | | | |
|---|---|---|---|---|
| 6,234,295 | B1 * | 5/2001 | Ogawa | B66B 23/12 198/333 |
| 6,640,958 | B2 * | 11/2003 | Postlmayr | B66B 21/02 104/288 |
| 7,353,932 | B2 * | 4/2008 | Aulanko | B66B 21/00 198/321 |
| 7,568,571 | B2 * | 8/2009 | Ogimura | B66B 23/026 198/330 |
| 8,083,048 | B2 * | 12/2011 | Ishikawa | B66B 23/022 198/326 |
| 2006/0070846 | A1 | 4/2006 | Andreas et al. | |
| 2011/0220455 | A1 | 9/2011 | Mustalahti et al. | |

FOREIGN PATENT DOCUMENTS

| | | | |
|---|---|---|---|
| EP | 2138430 | A1 | 12/2009 |
| KR | 1019990049125 | A | 7/1999 |
| KR | 2007-0012398 | A | 1/2007 |

OTHER PUBLICATIONS

Office Action issued in corresponding Japanese Patent Application No. 2014-512811; Action dated Nov. 7, 2014.
International Search Report for application PCT/US2012/063054, mailed Aug. 21, 2013, 3 pages.
Written Opinion for application PCT/US2012/063054, mailed Aug. 21, 2013, 3 pages.

* cited by examiner

*Primary Examiner* — Douglas Hess
(74) *Attorney, Agent, or Firm* — Cantor Colburn LLP

(57) ABSTRACT

A turnaround mechanism for a passenger conveyor may include a turnaround track for facilitating a smooth transition of a plurality of pallets between a passenger side and a return side. Each of die plurality of pallets may have a front end portion engaged to the turnaround track. The turnaround mechanism may further include a track exchange mechanism having a track exchanger for transitioning the at least one roller of each of the plurality of pallets between the passenger and the return sides, each of the plurality of pallets generally maintaining its orientation during the transitioning.

19 Claims, 7 Drawing Sheets

TURNAROUND MECHANISM FOR PASSENGER CONVEYORS

CROSS-REFERENCE TO RELATED APPLICATION

This application is a 35 USC §371 US National Stage filing of International Application No. PCT/US2012/063054 filed on Nov. 1, 2012.

TECHNICAL FIELD OF THE DISCLOSURE

The present disclosure is directed to passenger conveyors, and more particularly, to turnaround mechanisms for pallet type passenger conveyors.

BACKGROUND OF THE DISCLOSURE

Moving walkways are typically constructed in one of two basic styles, either pallet type or moving belt type. A moving belt type moving walkway typically includes a metal mesh or rubber belt disposed over a series of rollers. A pallet type moving walkway, on the other hand, includes a continuous series of pallets joined together to form a walkway.

Pallet-type moving walkways generally include a truss assembly, which houses a drive mechanism that drives the pallets. Specifically, the pallets are fixed to a pallet chain that includes a plurality of interconnected rollers. The pallet chain is engaged with a pallet chain roller track and is operatively connected to the drive mechanism, such as one or more drive sprockets. As the drive mechanism drives the pallet chain, the pallets move along the pallet chain roller track from a passenger side to a return side located below the passenger side. To transition from the passenger side to the return side a turnaround mechanism is used. The walkway assembly including the truss assembly, drive mechanism, the turnaround mechanism and the return side of the walkway are typically located in a pit constructed for that purpose. Furthermore, depending upon whether the pallets turn upside-down or maintain their orientation at the turnaround mechanism, the height of the pit may vary.

Moving walkways with such a pit construction have several disadvantages. For example, the height difference between the surrounding floor level and the passenger portion of the pallets (i.e. pallet height) may sometimes require relatively steep and/or lengthy ramps at the ends of the moving walkway for passenger comfort and handicapped access. In addition, parallel moving walkways, operating in opposite directions, typically require two pits, two drive mechanisms and two pallet bands, thereby further adding expense and space requirements for installation of the moving walkways.

Accordingly, it would be beneficial to have a moving walkway that may either not need a pit in the floor or the height of the pit is minimized. In so doing, the moving walkway may, therefore, be mounted either on finished, existing floors, or in foreseen openings of a floating screed without impacting the structure of floors (concrete ceilings, beams, etc.). It would also be beneficial if a moving walkway with a reduced height between the passenger side of the moving walkway and the surrounding floor surface is designed for passenger comfort, handicapped access, and/or the aesthetics of the landing design, while maintaining the functionality, simplicity, and reliability of its components.

SUMMARY OF THE DISCLOSURE

In accordance with one aspect of the present disclosure, a turnaround mechanism for a passenger conveyor is disclosed. The turnaround mechanism may include a turnaround track for facilitating a smooth transition of a plurality of pallets between a passenger side and a return side, each of the plurality of pallets may have a front end portion engaging the turnaround track and a rear end portion connected to a pallet chain, the pallet chain riding on a pallet chain roller track. The turnaround mechanism may also include a track exchanger engageable with the front edge portion of each of the plurality of pallets for transitioning the front edge portion of each of the plurality of pallets between the passenger side and the return side, each of the plurality of pallets maintaining a generally horizontal orientation during the transitioning.

In accordance with another aspect of the present disclosure, a method for turning pallets in a passenger conveyor is disclosed. The method may include providing (a) a pallet chain riding on a pallet chain roller track; (b) a turnaround track for facilitating a transition of a plurality of pallets between a passenger side and a return side thereof; and (c) a track exchange mechanism having a track exchanger. The method may also include supporting each of the plurality of pallets on the turnaround track and the pallet chain such that a front edge portion of each of the plurality of pallets engages the turnaround track, engaging the front end portion of each of the plurality of pallets into the track exchange mechanism and transitioning each of the plurality of pallets between the passenger side and the return side.

In accordance with yet another aspect of the present disclosure, a passenger conveyor is disclosed. The passenger conveyor may include a pallet chain riding on a pallet chain roller track in a continuous loop having a passenger side and a return side and a plurality of pallets, each of the plurality of pallets connected to the pallet chain and having a front edge. The passenger conveyor may also include a turnaround track connected between the pallet roller track and continuously travelling between the passenger and the return sides, the front edge portion of each of the plurality of pallets engaging the turnaround track and a track exchange mechanism having a track exchanger. The passenger conveyor may further include a triggering system to rotate the lower lever for fixing a position of the upper lever and setting a default position of the track exchanger.

Other advantages and features of the disclosed apparatus and method will be described in greater detail below. It will also be noted here and elsewhere that the apparatus or method disclosed herein may be suitably modified to be used in a wide variety of applications by one of ordinary skill in the art without undue experimentation.

BRIEF DESCRIPTION OF THE DRAWINGS

For a more complete understanding of the disclosed apparatus and method reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed device or method which render other details difficult to perceive may have been omitted. It should be understood, of course, that this disclosure is not limited to the particular embodiments illustrated herein.

DETAILED DESCRIPTION OF THE DISCLOSURE

Figure 1A:
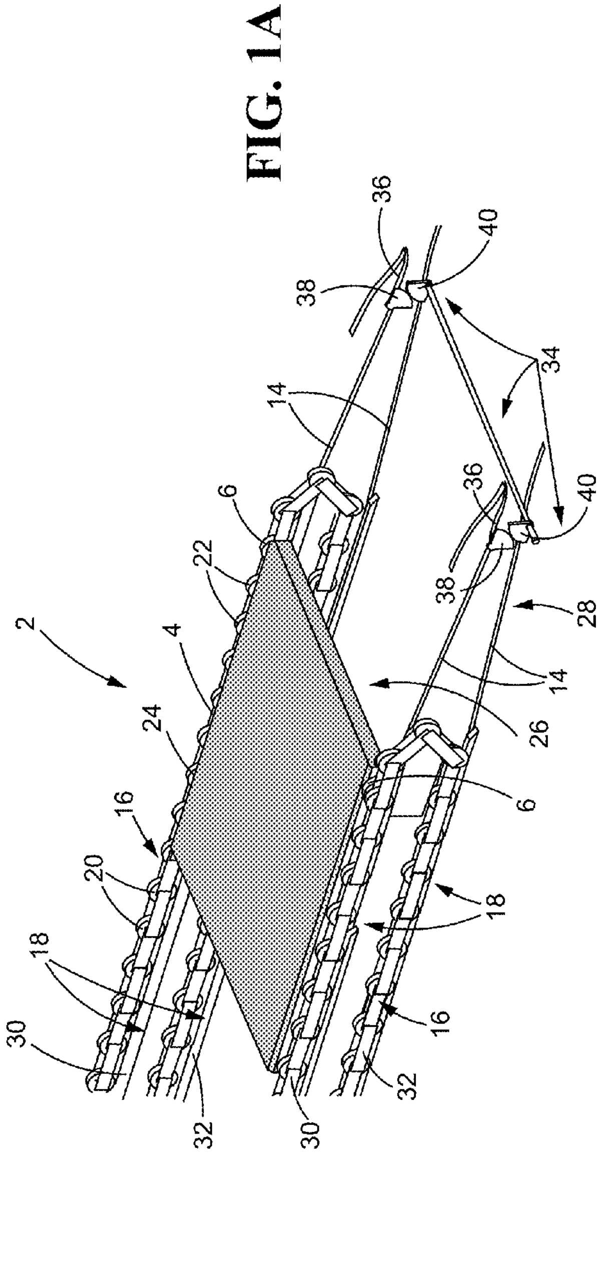
FIG. 1A is a schematic perspective view of an exemplary moving walkway showing a turnaround mechanism, in accordance with at least some embodiments of the present disclosure.
Figure 1B:
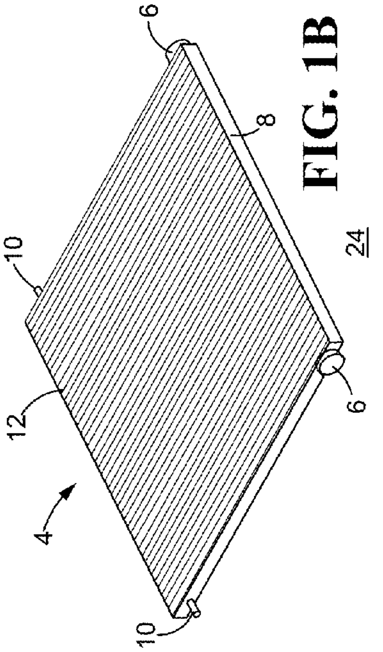
FIG. 1B shows an exemplary pallet of the moving walkway of FIG. 1A in greater detail.
Figure 1C:
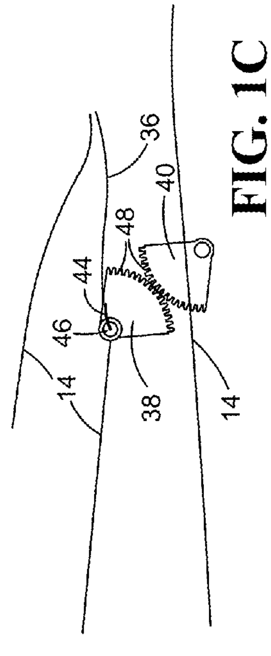
FIG. 1C shows a portion of the turnaround mechanism of FIG. 1A in greater detail.

Referring now to FIGS. 1A-1C, a perspective view of an exemplary passenger conveyor in the form of a moving walkway 2 is shown, in accordance with at least some embodiments of the present disclosure. Although disclosed and described in the embodiment of a moving walkway, it will be apparent from the description that follows that the invention may also be used with other forms of passenger conveyors, such as escalators. Further, as described below, "pallet" is used to identify the passenger carrying platform; it should be understood that "pallet" as used herein also encompasses steps as used in escalators.

As shown, the moving walkway 2 is a pallet type moving walkway having a plurality of pallets 4 (only one of which is shown). Each of the pallets 4 may have a pair of rollers 6 disposed on both sides of a front end portion 8 and a pair of pins 10 (See FIG. 1B) connected on either side of a rear end portion 12 of the pallets. The rollers 6 may be designed to ride on a turnaround track 14 of the moving walkway 2 for facilitating a turnaround of the pallets as described below, while each of the pins 10 may be connected to a pallet chain 16 riding on a pallet chain roller track 18. The pallet chain 16 in turn may include a plurality of interconnected links 20 and a plurality of rollers 22 that ride on the pallet chain roller track 18 on either side of the pallets 4. Notwithstanding the fact that in the present embodiment, the rollers 6 have been used to ride the pallets 4 on the turnaround track 14, in at least some embodiments, steel bearings or possibly solid cylindrical part fixed to pallet may be used as well. Relatedly, other mechanisms to ride the pallets 4 on the pallet chain roller track 18 may be utilized as well. Furthermore, the pins 10 may be part of a single solid axle (e.g., similar to a step chain axle) or alternatively, separate pins may also be used. In at least some embodiments, the pins 10 may have a pivot joint to connect to the pallets 4 and may also be fixed to chain roller bearings on the other side. Therefore, the pallets 4 may rotate against the pallet chain 16.

By virtue of connecting the rear end portion 12 of each of the pallets 4 to the pallet chain 16 (via the pins 10) and riding the front end portion 8 on the turnaround track 14, about fifty percent (50%) of the pallet weight may be supported by the turnaround track, while about fifty percent (50%) of the pallet weight may be supported by the pallet chain during turnaround of the pallets between a passenger side 24 (e.g., the side on which the passengers ride) and a return side 26 (e.g., the side opposing the passenger side), thereby minimizing an inertia effect during the turnaround and reducing vibrations caused at a turnaround portion 28 of the moving walkway 2. Furthermore, by connecting the rear end portion 12 of the pallets 4 to the pallet chain 16, the pallet chain may provide a driving force to make the turnaround with a minimal turnaround radius of the pallets and the pallet chain roller track 18. Turnaround of the pallets 4 is described in greater detail below.

With respect to the turnaround track 14 and the pallet roller track 18, each side of the turnaround track may form a continuous pathway between an upper pallet roller track 30 on the passenger side 24 and a lower pallet roller track 32 on the return side 26 of the pallet roller track 18. The turnaround track 14 may be utilized, as described further below, to transfer the front end portion 8 of each of the pallets 4 between the upper pallet roller track 30 and the lower pallet roller track 32 smoothly at the turnaround portion 28 while substantially maintaining the orientation of the pallets (e.g., without turning the pallets upside down), by moving the pallets in a horizontal direction. It will be understood that as the pallets 4 transition from the lower pallet roller track 32 to the upper pallet roller track 30, the pallets may teeter a little bit, although the orientation of those pallets may be generally maintained. Additionally, the turnaround track 14 may extend further than the pallet roller track 18 and the portion of the turnaround track beyond the pallet roller track may be somewhat inclined to facilitate the turnaround of the pallets 4. The incline of the turnaround track 14 may be determined mainly by the length of the pallets 4 and the height between the upper and the lower pallet roller tracks 30 and 32, respectively.

Referring still to FIGS. 1A-1C, a track exchange mechanism 34 of the moving walkway 2 may be utilized for facilitating direction reversal of the pallets 4 at the turnaround portion 28 of the moving walkway 2. As shown in FIG. 1A, the track exchange mechanism 34 may be installed on both sides of the turnaround track 14 and each side may include a track exchanger 36, an upper lever 38 and a lower lever 40. A lever synchronization shaft 42 may connect the lower levers 40 on both sides although in other embodiments, the synchronization shaft may connect the upper levers 38 on both sides. The track exchanger 36 and the upper lever 38 on each side may be connected to the turnaround track 14 via a hinge mechanism 44 and have a rotational spring 46 (See FIG. 1C). The rotational spring 46 may be connected between the upper lever 38 and the track exchanger 36. The hinge mechanism 44 (and therefore, the track exchange mechanism 34) may preferably be located close to the middle of the upper and the lower pallet roller tracks 30 and 32, respectively, although in at least some embodiments, the hinge mechanism may be located at any vertical location between the upper and the lower pallet roller tracks.

Furthermore, as shown in FIG. 1C, the upper lever 38 and the lower lever 40 may be connected to one another via a toothed arrangement 48 although, other types of engagement mechanisms may be employed as well. By virtue of connecting the upper lever 38 and the lower lever 40 via the toothed arrangement 48, the lower lever may be rotated via the synchronization shaft 42 to fix the position of the upper lever relative to the turnaround track, and the fixed position of the upper lever may determine a default position of the track exchanger 36 to facilitate a turnaround of the pallets 4. The default position of the track exchanger 36 may vary depending upon whether the pallets 4 are moving from the passenger side 24 to the return side 26 or vice-versa. Thus, based upon the direction of movement of the pallets 4, the lower levers 40 may be rotated to fix the position of the upper levers 38 to set the default position of the track exchanger 36 for that direction. The default positions of the track exchanger 36 are described in greater detail below. Moreover, the track exchange mechanism 34 may employ either a mechanical triggering system or an electrical triggering system (both discussed below) to rotate the lower levers 40 for fixing the position of the upper levers 38 and setting the default positions of the track exchanger 36, both of which are also described below.

Figure 2A:
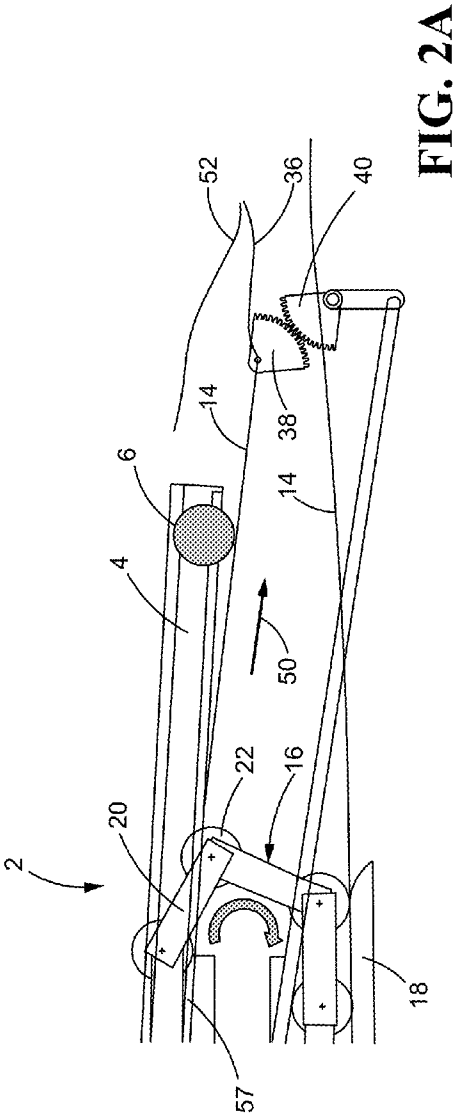
FIGS. 2A-2B show various steps of running the moving walkway in an up-running direction using the turnaround mechanism of FIG. 1A.
Figure 2B:
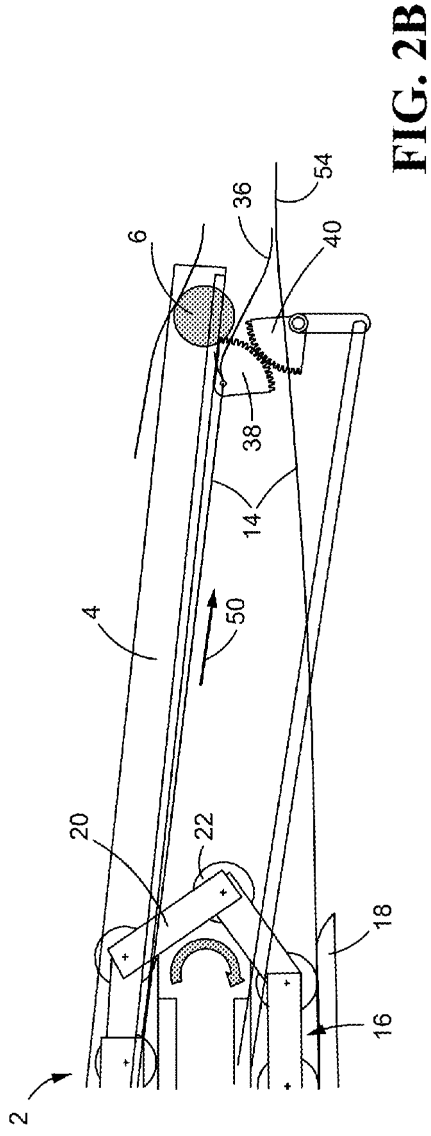
Figure 3A:
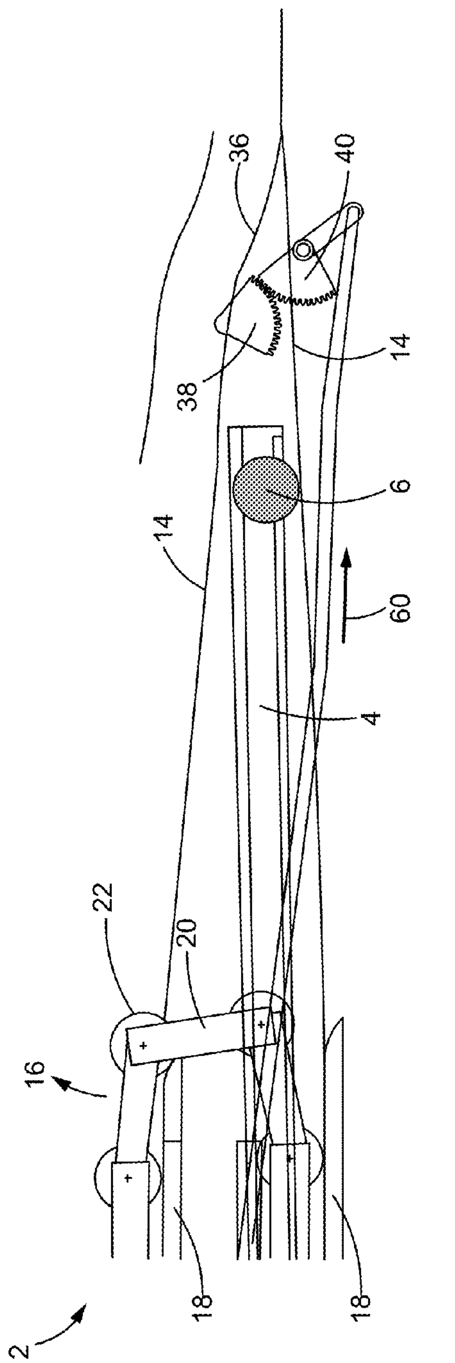
FIGS. 3A-3B show various steps of running the moving walkway in a down-running direction using the turnaround mechanism of FIG. 1A.
Figure 3B:
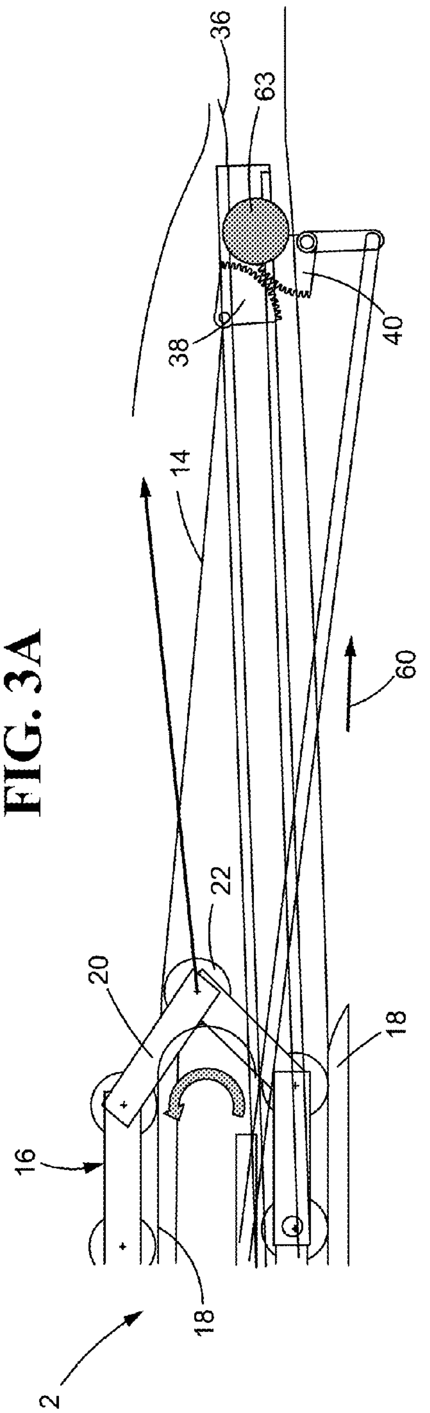

Turning now to FIGS. 2A-3B, the steps of transitioning the pallets 4 from/to the upper pallet roller track 30 on the passenger side 24 to/from the lower pallet roller track 32 on the return side 26 are shown, in accordance with at least some embodiments of the present disclosure. Specifically, FIGS. 2A-2B show the steps for turning the pallets 4 from the passenger side 24 to the return side 26, while FIGS. 3A-3B show the steps for turning the pallets from the return side to the passenger side. It will be understood that while the FIGS. 2A-3B below have been shown with a mechanical triggering system, similar steps of operation for transitioning the pallets 4 between passenger side 24 and return side 26 will be applicable to a moving walkway having an electrical triggering system.

Referring specifically now to FIGS. 2A-2B, the turnaround of the pallets 4 from the passenger side 24 to the return side 26 may begin with the pallet rollers 6 on the passenger side following the turnaround track 14 and entering the track exchange mechanism 34 at the turnaround portion 28 of the moving walkway 2, as shown in FIG. 2A. The rear end portion 12 of the pallets 4 may be following the pallet chain 16. The pallets 4 may be moving in a direction indicated by arrow 50. At this time, the track exchanger 36 may remain in its default position. As will be described further below, the default position of the track exchanger 36 when the pallets 4 are transitioning from the passenger side 24 to the return side 26 is in the up position and adjacent (or contacting) an upper portion 52 of the turnaround track.

Next, as shown in FIG. 2B, in order to turnaround, the pallet rollers 6 may pass through the track exchange mechanism 34 by pushing the track exchanger 36 to a down position and adjacent (or contacting) a lower portion 54 of the turnaround track 14. The track exchanger 36 may be moved from its default up position to the down position by overcoming the rotational spring force of the spring 46 as the rollers 6 of the pallets 4 pass over the track exchanger 36. After pushing the track exchanger 36 in the down position, the rollers 6 of the pallets 4 follow the track exchanger, as also shown in FIG. 2B and gradually transition from the turnaround track 14 on the passenger side 24 to the turnaround track on the return side 26. The track exchanger 36 may be designed with a smooth profile to minimize vibrations during the transition of the rollers 6 from the passenger side 24 to the return side 26 of the turnaround track 14.

After the rollers 6 pass through the track exchanger 36 and land on the return side 26 of the turnaround track 14, the track exchanger may return to its initial default up position by the recovery torque of the rotational spring 46 after the rollers exit the track exchanger. Specifically and as discussed above, the track exchanger 36 may be connected to upper lever 38 with the rotational spring 46, both of which may be able to rotate around the hinge joint axis 44. Rotation of the upper lever 38 may be determined by the connection with the lower lever 40 during operation. Therefore, the track exchanger 34 may be able to rotate free due to the contact with the rollers 6 and return to its original position after the roller no longer contact the track exchanger. Further movement of the pallets 4 to the right side on the turnaround track 14 may be prevented by virtue of the rear end portion 12 of the pallets 4 being connected to the pallet chain 16 driving on a pallet chain roller track 57 and the pallet chain roller track being shorter than the turnaround track. As a result of continuous motion of the pallet chain 16 on the pallet chain roller track 57 from the passenger side 24 to the return side, the pallet chain slowly pulls the pallets along with it and the pallets start to move in a direction indicated by arrow 58 on the return side 26 of the turnaround track 14.

Turning now to FIGS. 3A-3B, turnaround of the pallets 4 when they move from the return side 26 to the passenger side 24 will be described. Specifically and shown in FIG. 3A, the rollers 6 of the pallets 4 follow the return side 26 of the turnaround track 14 in a direction indicated by arrow 60 and enter the track exchange mechanism 34. At this time the track exchanger 36 is in its default position. As will be described further below, the default position of the track exchanger 36 when the pallets 4 are transitioning from the return side 26 to the passenger side 24 is the down position adjacent to (or contacting) the lower portion 54 of the turnaround track 14. Then, as shown in FIG. 3B, as the rollers 6 pass through the track exchanger, the rollers overcome the rotational spring force of the spring 46 and cause the track exchanger to shift in the up position adjacent to (or contacting) the upper portion 52 of the turnaround track 14.

After the rollers 6 pass through the track exchanger 36, the track exchanger may return to its default down position due to the recovery torque of the rotational spring 46 after the rollers exit the track exchanger. Additionally, further movement of the pallets 4 may be avoided due to the rear end portion 12 of the pallets being connected to the pallet chain 16 and the pallet chain roller track 57 being shorter than the turnaround track 14. Then, due to a continuous progress of the pallet chain 16 and the pallets 4 being connected to the pallet chain, as the pallet chain rides along the pallet chain roller track 57, the pallet chain pulls the pallet connected thereto along and the pallet is pulled from the return side 26 of the turnaround track 14 to the passenger side of the turnaround track in a direction indicated by arrow 64.

Figure 5A:
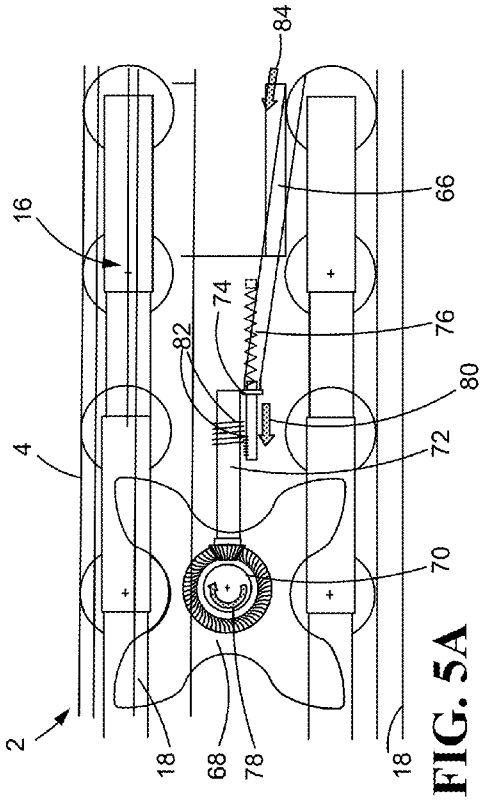
FIGS. 5A-5B show various steps of setting a default position of a track exchanger using the mechanical triggering system of FIG. 4 in an up-running direction.
Figure 5B:
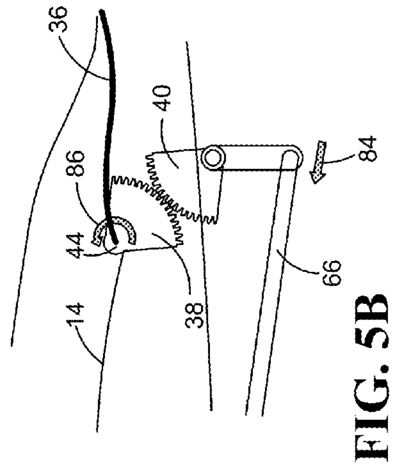
Figure 6B:
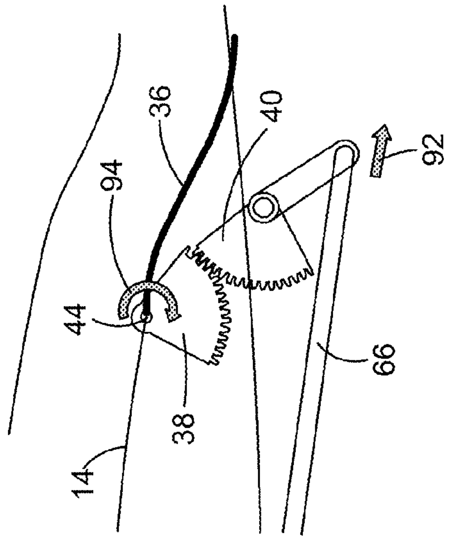
FIGS. 6A-6B show various steps of setting a default position of a track exchanger using the mechanical triggering system of FIG. 4 in a down-running direction.
Figure 6A:
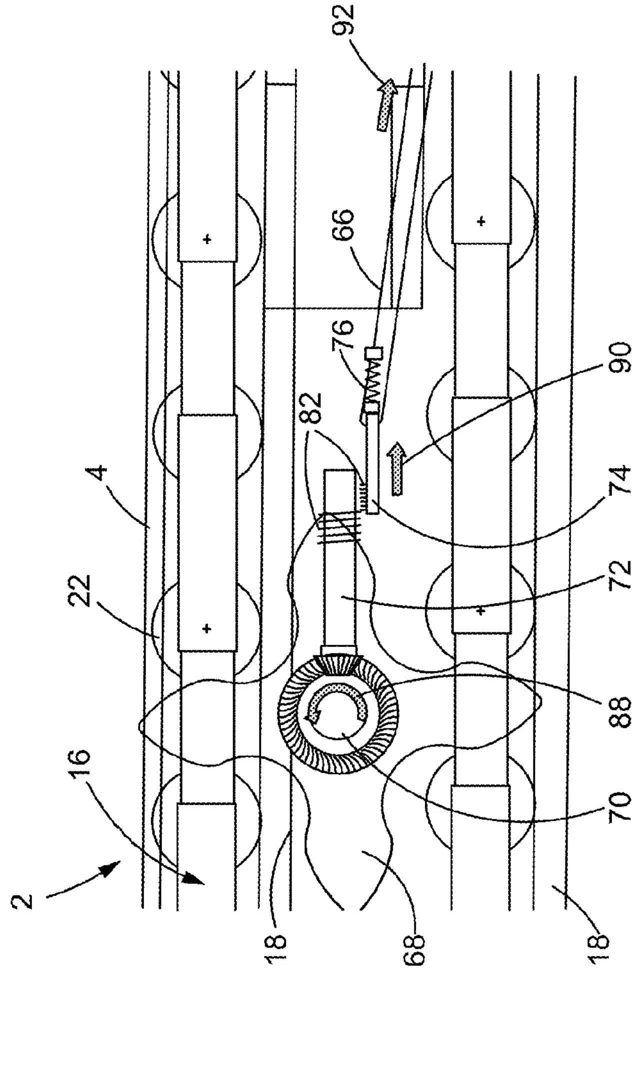
Figure 7A:
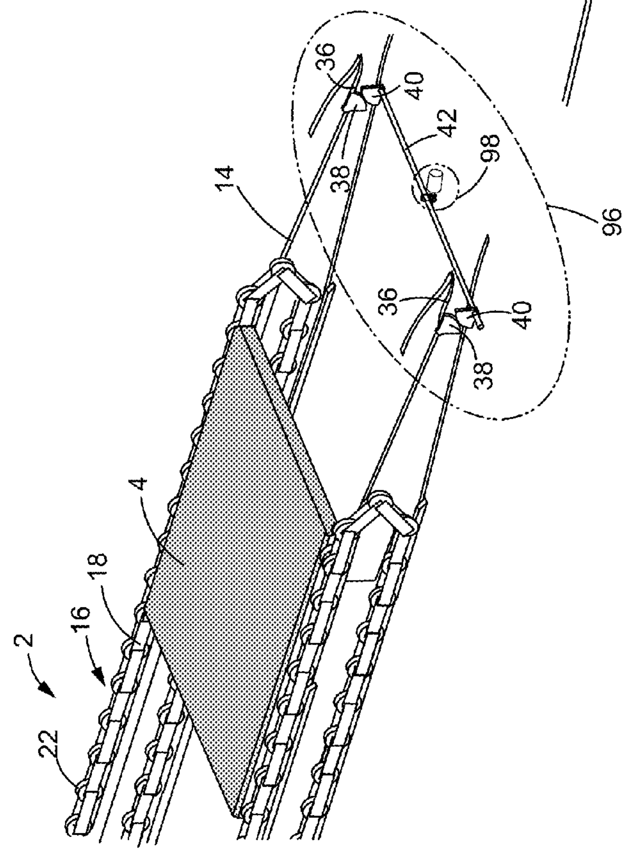
FIGS. 7A-7B show an alternative embodiment having an electrical triggering system for use with the turnaround mechanism of FIG. 1A.
Figure 7B:
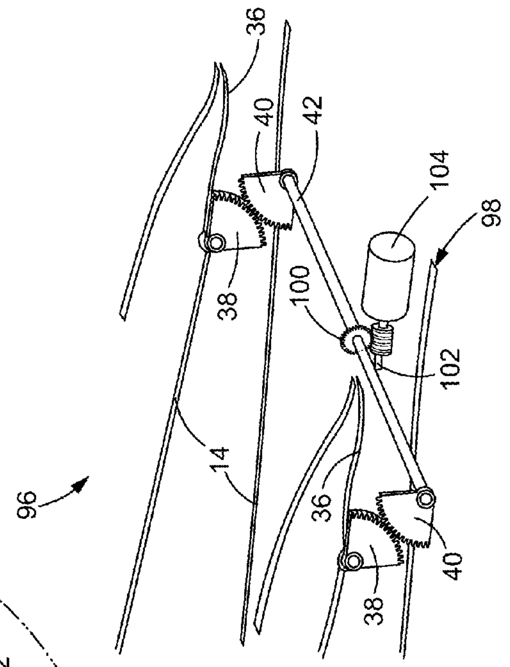

Referring now to FIGS. 4-7B, the mechanical and electrical triggering systems for rotating the lower levers 40 will be described. Specifically, FIGS. 4-6B show an exemplary mechanical triggering system for use with the moving walkway 2, while FIGS. 7A and 7B show an exemplary electrical triggering system.

Figure 4:
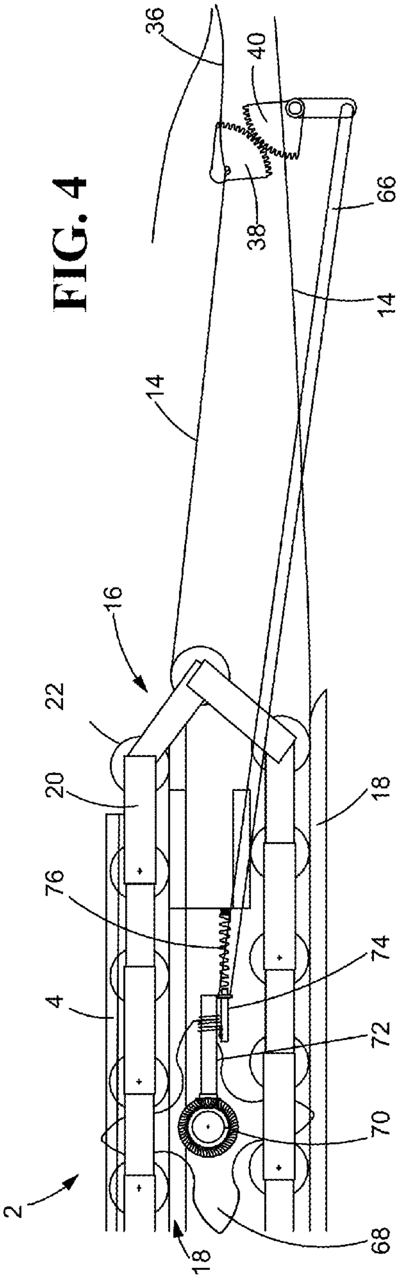
FIG. 4 is a schematic side view of a moving walkway showing a mechanical triggering system for use with the turnaround mechanism of FIG. 1A.

Turning first to FIG. 4, the mechanical triggering system may include a connection link 66, a pallet chain sprocket 68, a bevel wheel 70, a transmission shaft 72, a slider 74 and a spring 76. The pallet chain sprocket 68 may be connected to the pallet chain 16 and the bevel wheel 70 may be connected to the pallet chain sprocket. Furthermore, one end of the transmission shaft 70 may be connected (e.g., via a geared arrangement) to the bevel wheel 70 while the other end of the transmission shaft may be in a geared arrangement with the slider 74. The slider 74 in turn may connect to one end of the connection link 66, while the other end of the connection link may be connected to the lower lever 40. By virtue of connecting the connection link 66 to the lower lever 40, interference between the front end portion 8 of the pallets 4 and the synchronization shaft 42 may be avoided.

In operation, as the pallet chain 16 circulates, the pallet chain sprocket 68 and the bevel wheel 70 rotate in the same direction as the pallet chain. Rotation of the pallet chain sprocket 68 and the bevel wheel 70 may cause the transmission shaft 72 connected to the bevel wheel to rotate, causing the slider 74 to move in left and right directions due to the geared arrangement therebetween. This left and right motion of the slider 74 may in turn cause the connection link 66 connected to the slider to follow the left and right motion of the slider. By virtue of moving the connection link 66, position of the lower lever 40 connected to the connection link may be varied and as discussed above, by varying the position of the lower lever, the position of the upper lever 38 may be fixed. Fixing the position of the upper lever 38 may determine the default position of the track exchanger 36, as further described below. It will be understood that the movement of the track exchanger 36 between the up position and the down position occurs when the operating direction of the pallet chain 16 is changed. While travelling either from the passenger side 24 to the return side 26 or vice-versa, the track exchanger 36 remains at one default position. In other words, the movement of the sprocket 68 by the pallet chain 16 correctly puts the track exchanger 34 into the proper default position for the direction of movement of the pallet chain.

Turning to FIGS. 5A and 5B, the steps in setting the default position of the track exchanger 36 when the pallets 4 are moving from the passenger side 24 to the return side 26 using the mechanical triggering system will be described. As shown particularly in FIG. 5A, the rollers 22 of the pallet chain 16 may turn in a clockwise direction (assuming the turnaround portion 28 is on the right hand side). Accordingly, the pallet chain sprocket 68, which is engaged with the rollers 22 of the pallet chain 16, also rotates in the clockwise direction and rotates the bevel wheel 70 which is fixed on the pallet chain sprocket therealong, as indicated by arrow 78. The bevel wheel 70 may in turn rotate the transmission Shaft 72 through a bevel geared engagement between the bevel wheel and the transmission shaft. When the transmission shaft 72 rotates, the slider 74 moves to a left side, as shown by arrow 80.

Specifically, and as mentioned above, the slider 74 may be connected to the transmission shaft 72 via a geared arrangement. In at least some embodiments, the geared arrangement may be a worm gear arrangement having a limited number of worm teeth 82 on the slider and the transmission shaft. The number of worm teeth 82 on the slider 74 and the transmission shaft 72 may depend upon the horizontal distance (left or right) that the slider 74 may be required to move. Relatedly, the worm teeth 82 may be configured to move the slider 74 towards the left when the pallet chain 16 is moving from the passenger side 24 to the return side 26 and to move to the right when the pallet chain is moving from the return side 26 to the passenger side 24. By virtue of configuring the slider 74 and the transmission shaft 72 with a limited number of worm teeth 82 and by configuring those worm teeth to move in the appropriate direction, it may be ensured that the motion of the slider does not exceed a certain horizontal distance and the correct default position of the track exchanger 36 for that particular travel direction of the pallet chain 16 may be set.

Thus, when the slider 74 moves towards the left side due to the pallet chain 16 travelling from the passenger side 24 to the return side 26, the connection link 66 connected to the slider may move towards the left as well in a direction indicated by arrow 84. Movement of the connection link 66 may cause the lower lever 40 to rotate in a clockwise direction, thereby fixing the position of the upper lever 38 due to the toothed arrangement 48 between the upper and the lower levers. The upper lever 38 may rotate in a counter-clockwise direction indicated by arrow 86. Fixing the position of the upper lever 38 may locate the default position of the track exchanger 36 when the pallets 4 are moving from the passenger side 24 to the return side 26. As discussed above, the default position for the track exchanger 36 when the pallets 4 are moving from the passenger side 24 to the return side 26 is in an up position, as shown in FIG. 5B.

It will be understood that in some instances, the transmission shaft 72 may continue to rotate even if the engagement of the worm teeth 82 between the transmission shaft and the slider has ended and the slider 74 may continue to move towards the left side (or right side when the pallets 4 are moving from the return side 26 to the passenger side 24, described below) due to inertia. In such cases, to prevent further movement of the slider 74 when the engagement of the worm teeth 82 has ended, the spring 76 connected between the slider and a truss may be utilized in order to limit the horizontal distance of the slider. The spring 76 may be set to generate no force when the worm teeth 82 on the slider 74 locate in the middle of the worm teeth on the transmission shaft 72.

Furthermore, a pair of mechanical triggering systems, one on each side of the pallet chain roller track 57, may be utilized in some embodiments. Alternatively and as shown, only one of the mechanical triggering system may be used to rotate the lower lever 40 connected to the connection link 66 and rotation of that lower lever may cause the lower lever of the other side to rotate via the lever synchronization shaft (which may rotate when the lower lever connected to the connection link rotates).

Turning now to FIGS. 6A and 6B, setting a default position of the track exchanger 36 when the pallet chain 16 is travelling from the return side 26 to the passenger side 24 will be described. Specifically, the pallet chain 16, as well as the pallet chain sprocket 68 and the bevel wheel 70 may turn in a counter-clockwise direction, as shown by arrow 88. The bevel wheel 70 may in turn rotate the transmission shaft 72, which may then move the slider 74 (due to the geared arrangement therebetween) towards the right side, as indicated by arrow 90. As discussed above, the worm teeth 82 may be configured such that the slider 74 moves towards the right when the pallets 4 move from the return side 26 to the passenger side 24. When the slider 74 moves towards the right side, the connection link 66 may also move towards the right, as indicated by arrow 92, thereby rotating the lower lever 40 in a counter-clockwise direction as well. As a result, the upper lever 38 may be turned in a clockwise direction, shown by arrow 94, to fix its position. The fixed position of the upper lever 38 may locate the default position of the track exchanger 36 in a down position, as discussed above.

Referring now to FIGS. 7A and 7B, the electrical triggering system will be described. FIG. 7A shows an exemplary moving walkway having an electrical triggering system 98, while FIG. 7B shows a circled portion 96 of FIG. 7A in greater detail. The electrical triggering system 98 may include a wheel 100 (also referred to herein as a worm wheel) in a geared arrangement with a shaft 102 (also referred to herein as a worm shaft) connected to and driven by a motor 104. In at least some embodiments, the geared arrangement between the wheel 100 and the shaft 102 may be a worm gear arrangement with the shaft having a plurality of worm teeth capable of engagement with teeth of the wheel. The wheel 100 may be mounted to the lever synchronization shaft 42 and the shaft 102 may also be connected to the lever synchronization shaft.

The operation (e.g., direction of rotation) of the motor 104 may be controlled by a controller (not shown). Depending upon the direction of travel of the pallet chain 16, the controller may control the rotation of the motor 104. For example, when the pallet chain 16 is travelling from the passenger side 24 to the return side 26, the controller may instruct the motor 104 to rotate in a certain (e.g., clockwise or counter-clockwise) direction, while when the pallet chain is moving from the return side to the passenger side, the controller may instruct the motor to rotate in an opposite direction. By virtue of rotating the motor 104, the shaft 102 connected to the motor may be made to rotate in the same direction as the motor. Rotation of the shaft 102 may alter the geared arrangement between the wheel 100 and the shaft, causing the lever synchronization shaft 42 to rotate as well, which in turn may cause the lower lever 40 of both sides to rotate for fixing the position of the upper lever 38, in a manner described above. As also described above, by fixing the position of the upper lever 38, the default position of the track exchanger 36 may be set to an up position when the pallets 4 are moving from the passenger side 24 to the return side 26 and to a down position when the pallets are moving from the return side to the passenger side.

Figure 8:
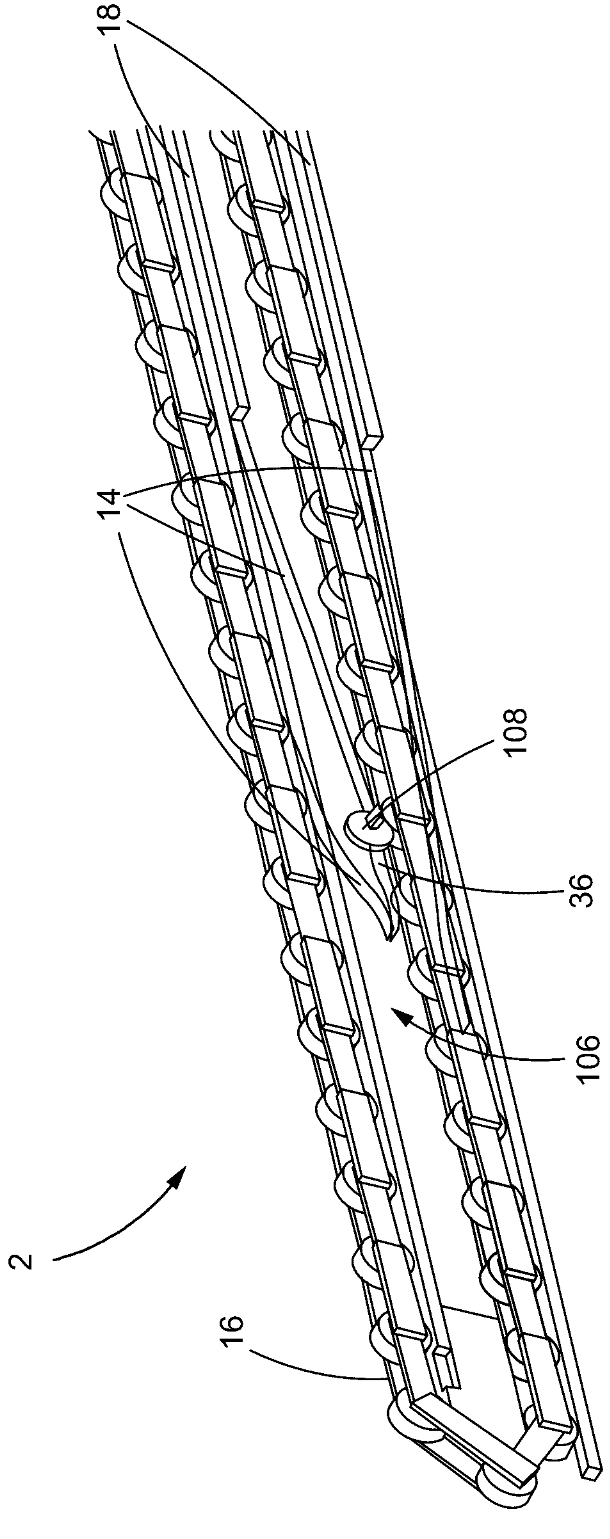
FIG. 8 shows a schematic illustration of the turnaround mechanism on the opposite side of the turnaround mechanism shown in FIG. 1A.

Referring now to FIG. 8, the moving walk way 2 may be a two-way walkway. That is, transitioning of the pallets 4 from the passenger side 24 to the return side 26 and vice-versa, may be facilitated on either side of the moving walkway 2. Accordingly, in order to transition between the passenger and the return sides 24 and 26, respectively, a turnaround mechanism 106 may be provided on the other end of the moving walkway 2 as well. The turnaround mechanism 106 may be substantially similar to the turnaround mechanism 34 described above in both structure and operation. Hence, only the differences between the two turnaround mechanisms are described here. For example, in contrast to the turnaround mechanism 34 which includes both the upper lever 38 and the lower lever 40, the turnaround mechanism 106 may only include an upper lever 108. Furthermore, the upper lever 108 may be toothless and may be connected to the track exchanger 36 via the rotational spring 46 (not visible in FIG. 8). The turnaround mechanism 106 may be used with either the mechanical triggering system or with the electrical triggering system, as described above and those triggering mechanisms may be directly connected to the upper lever for transitioning the pallets 4 between the passenger side 24 and the return side 26.

INDUSTRIAL APPLICABILITY

In general, the present disclosure sets forth a turnaround mechanism for a moving walkway. The turnaround mechanism may include a turnaround track connected to a pallet roller track and having a track exchange mechanism. The track exchange mechanism may in turn include upper and lower levers connected via geared arrangement as well as a lever synchronization shaft connecting the lower levers on both sides of the turnaround track. The track exchange mechanism may also include a track exchanger connected to the upper lever via a rotational spring, such that by fixing the position of the upper lever, a default position of the track exchanger may be set. The position of the upper lever may be fixed by rotating the lower levers. A mechanical, electrical or a combination of the two triggering systems may be employed for rotating the lower levers.

The turnaround track and the track exchange mechanism may be configured such that a front end of the pallets of the moving walkway follow the turnaround track, while a rear end of the pallets are connected to a pallet chain and ride on the pallet chain roller track. Advantageously, the track exchange mechanism may transition the pallets between a passenger side and a return side, while the rear end continues to ride on the pallet chain roller track, thereby facilitating a turnaround without changing the orientation of the pallets at the turnaround and providing a pit free design and a flat turnaround system.

Furthermore, the proposed turnaround mechanism needs less energy consumption to execute the turnaround movement compared to conventional turnaround mechanisms which carry complete pallet weight. As discussed above, each pallet is engaged with both the turnaround track as well as the pallet chain. The pallet chain only carries about fifty percent (50%) of the pallet weight, while rest (about fifty percent (50%)) of the pallet weight is continuously carried by the turnaround track, thereby minimizing the inertia effect of the pallets in the turnaround area on the movement of the pallet chain for providing energy savings.

Moreover, combination of circumferential movement and horizontal movement of the pallets during turnaround minimizes the vibration impact caused by the pallet inertia during turnaround motion. Specifically, the circumferential movement arises on one side of the pallets connected to the pallet chain, and horizontal movement arises on the other side of pallets by passing through the turnaround mechanism. Therefore, the turnaround mechanism minimizes vibrations as well as inertia impact during vertical transition movement. Conventional technologies have only circumferential movement of the pallets in the turnaround area creating vibrations on the pallet chain roller track. Additionally, with the above turnaround mechanism, the pallets can be designed with longer pallet lengths to reduce the manufacturing cost of the pallets.

It will be understood that while the turnaround mechanism has been described above in relation to a passenger moving walkway, the teachings of the present disclosure may be applicable to other types of walkways, including cargo walkways and escalators.

While only certain embodiments have been set forth, alternative embodiments and various modifications will be apparent from the above descriptions to those skilled in the art. These and other alternatives are considered equivalents and within the spirit and scope of this disclosure.

I claim:

1. A turnaround mechanism for a passenger conveyor, the turnaround mechanism comprising:

a turnaround track for facilitating a smooth transition of a plurality of pallets between a passenger side and a return side, each of the plurality of pallets having a front end portion engaging the turnaround track and a rear end portion connected to a pallet chain , the pallet chain riding on a pallet chain roller track;

a track exchange mechanism having a track exchanger engageable with the front edge portion of each of the plurality of pallets for transitioning the front edge portion of each of the plurality of pallets between the passenger side and the return side, each of the plurality of pallets maintaining a generally horizontal orientation during the transitioning; and a plurality of levers including an upper lever and a lower lever, the upper lever and the lower lever in toothed arrangement with one another, the upper lever connected to the turnaround track.

2. The turnaround mechanism of claim 1, wherein the track exchanger and the upper lever are connected to the turnaround track with a rotational spring connected between the track exchanger and the upper lever.

3. The turnaround mechanism of claim 1, wherein based upon a direction of travel of the pallet chain, the position of the upper lever is fixed to set a default position of the track exchanger.

4. The turnaround mechanism of claim 3, wherein the position of the upper lever is fixed by rotating the lower lever.

5. The turnaround mechanism of claim 1, further comprising a mechanical triggering system for actuating the plurality of levers for setting a default position of the track exchanger, the mechanical triggering system comprising;

a pallet chain sprocket connected to and rotating with the pallet chain;

a bevel wheel connected to and rotating with the pallet chain sprocket;

a transmission shaft connected to and rotating with the bevel wheel;

a slider in a geared arrangement with the transmission shaft, the rotation of the transmission shaft being translated into a horizontal movement of the slider; and a connection link connected on one end to the slider and to one of the plurality of levers on the other end, the connection link moving in a horizontal direction along with the slider to actuate the plurality of levers for setting the default position of the track exchanger.

6. The turnaround mechanism of claim 5, further comprising a spring connected to the slider for limiting the horizontal movement of the slider.

7. The turnaround mechanism of claim 1, further comprising an electrical triggering system for actuating the plurality of levers for setting a default position of the track exchanger, the electrical triggering system comprising:

a wheel mounted on a synchronization shaft;

a worm shaft connected to and driven by a motor, the worm shaft in a geared arrangement with the wheel such that rotation of the motor causes rotation of the worm shaft and the synchronization shaft to actuate the plurality of levers for setting the default position of the track exchanger.

8. The turnaround mechanism of claim 1, wherein about fifty percent of weight of each of the plurality of pallets is carried by the turnaround track and about fifty percent of the weight of each of the plurality of pallets is carried by the pallet chain roller track.

9. A method for turning pallets in a passenger conveyor, the method comprising:

providing a pallet chain riding on a pallet chain roller track; a turnaround track for facilitating a transition of a plurality of pallets between a passenger side and a return side thereof; and a track exchange mechanism having a track exchanger;

supporting each of the plurality of pallets on the turnaround track and the pallet chain such that a front edge portion of each of the plurality of pallets engages the turnaround track;

rotating a lower lever in a geared arrangement with an upper lever to set a default position of the track exchanger in an up position;

engaging the front end portion of each of the plurality of pallets into the track exchange mechanism; and transitioning each of the plurality of pallets between the passenger side and the return side.

10. The method of claim 9, wherein transitioning each of the plurality of pallets from the passenger side to the return side includes setting the default position of the track exchanger and setting the default position comprises:

providing a mechanical triggering system having a pallet chain sprocket connected to the pallet chain, a bevel wheel connected to the pallet chain sprocket, a transmission shaft connected to the bevel wheel, a slider in geared arrangement with the transmission shaft and a connection link connected at one end to the slider and to the lower lever at the other end;

rotating the pallet chain in a clockwise direction on the pallet chain roller track;

rotating the pallet chain sprocket, the bevel wheel and the transmission shaft in the clockwise direction along with the pallet chain;

moving the slider towards a left side in response to the rotation of the transmission shaft;

moving the connection link to the left side in response to the movement of the slider;

rotating the lower lever clockwise due to the movement of the connection link;

rotating the upper lever in a counter-clockwise direction due to the geared arrangement between the lower lever and the upper lever and fixing the position of the upper lever;

and setting the default position of the track exchanger in an up position.

11. The method of claim 9, wherein transitioning each of the plurality of pallets from the return side to the passenger side includes setting the default position of the track exchanger and setting the default position comprises:

providing a mechanical triggering system having a pallet chain sprocket connected to the pallet chain , a bevel wheel connected to the pallet chain sprocket , a transmission shaft connected to the bevel wheel , a slider in geared arrangement with the transmission shaft and a connection link connected at one end to the slider and to the lower lever at the other end;

rotating the pallet chain in a counter-clockwise direction on the pallet chain roller track;

rotating the pallet chain sprocket , the bevel wheel and the transmission shaft in the counter-clockwise direction along with the pallet chain;

moving the slider towards a right side in response to the rotation of the transmission shaft;

moving the connection link to the right side in response to the movement of the slider;

rotating the lower lever counter-clockwise due to the movement of the connection link;

rotating the upper lever in a clockwise direction due to a geared arrangement between the lower lever and the upper lever and fixing the position of the upper lever; and setting the default position of the track exchanger in a down position.

12. The method of claim 9, wherein setting the default position of the track exchanger comprises:

providing an electrical triggering system having a wheel mounted on a synchronization shaft connected to the lower lever, a worm shaft in geared arrangement with the wheel and connected to the synchronization shaft and a motor connected to and driving the worm shaft;
rotating the motor in a certain direction;
rotating the worm shaft in response to the rotation of the motor;
rotating the wheel in response to the rotation of the worm shaft, thereby rotating the synchronization shaft;
rotating the lower lever in response to the rotation of the synchronization shaft and fixing the position of the upper lever; and
setting the default position of the track exchanger, the default position being the up position when the plurality of pallets are moving from the passenger side to the return side and the down position when the plurality of pallets are moving from the return side to the passenger side.

13. The method of claim 9, wherein transitioning the plurality of pallets from the passenger side to the return side comprises:
moving the pallet chain and the plurality of pallets on the passenger side towards a turnaround portion;
passing the front end portion of each of the plurality of pallets over the upper lever on the passenger side of the turnaround track and pushing the track exchanger to a down position from its default position by overcoming a rotational force of the rotational spring;
riding the front end portion of each of the plurality of pallets over the track exchanger to transition each of the plurality of pallets from the passenger side to the return side;
returning the track exchanger back to its default position; and
moving the plurality of pallets on the return side away from the turnaround portion.

14. The method of claim 9, wherein transitioning the plurality of pallets from the return side to the passenger side comprises:
moving the pallet chain and the plurality of pallets towards the turnaround track on the return side;
passing the front end portion of each of the plurality of pallets through the upper lever area on the return side of the turnaround track and pushing the track exchanger to an up position from its default down position by overcoming a rotational force of the rotational spring;
returning the track exchanger back to its default position;
riding the front end portion of each of the plurality of pallets over the track exchanger to transition each of the plurality of pallets from the return side to the passenger side; and
moving the plurality of pallets away from the turnaround portion on the passenger side.

15. A passenger conveyor, comprising:
a pallet chain riding on a pallet chain roller track in a continuous loop having a passenger side and a return side;
a plurality of pallets, each of the plurality of pallets connected to the pallet chain and having a front edge;
a turnaround track connected between the pallet roller track and continuously travelling between the passenger and the return sides, the front edge portion of each of the plurality of pallets engaging the turnaround track;
a track exchange mechanism having a track exchanger; and
a triggering system to rotate a lower lever in a geared arrangement with an upper lever and setting a default position of the track exchanger.

16. The passenger conveyor of claim 15, wherein the triggering system comprises at least one of a mechanical triggering system and an electrical triggering system.

17. The passenger conveyor of claim 15, wherein the plurality of pallets remain in the same horizontal orientation when transitioning between the passenger and the return sides.

18. The passenger conveyor of claim 15, wherein vibrations of the plurality of pallets during turnaround is minimized due to the plurality of pallets having a circumferential and a horizontal movement.

19. The passenger conveyor of claim 15, wherein the pallet chain is capable of running from the passenger side to the return side and from the return side to the passenger side.

* * * * *